United States Patent

[11] 3,602,076

| [72] | Inventor | Siegfried Puck<br>Neviges, Germany |
|---|---|---|
| [21] | Appl. No. | 798,965 |
| [22] | Filed | Feb. 13, 1969 |
| [45] | Patented | Aug. 31, 1971 |
| [73] | Assignee | Hugo Karrenberg & Sohn K.-G.<br>Velbert, Germany |
| [32] | Priority | Feb. 13, 1968 |
| [33] | | Germany |
| [31] | | P 16 52 693.5 |

[54] TURNING TOOL ARRANGEMENTS FOR ROTATING CUTTER HEADS IN AUTOMATIC LATHES
1 Claim, 2 Drawing Figs.

[52] U.S. Cl. .................................................... 82/20
[51] Int. Cl. .................................................... B23b 5/12
[50] Field of Search ......................................... 82/20

[56] References Cited
UNITED STATES PATENTS

| 448,764 | 3/1891 | Jones............................ | 82/20 |
| 3,381,558 | 5/1968 | Eisenhardt .................. | 82/20 |

FOREIGN PATENTS

| 419,785 | 3/1967 | Switzerland................. | 82/20 |

Primary Examiner—Leonidas Vlachos
Attorney—Arthur Schwartz

ABSTRACT: The present invention relates to a turning tool arrangement, in automatic lathes, for rotating cutter heads with tool holders in the form of rocking levers directing the attack of the cutter points approximately radially against the work.

PATENTED AUG 31 1971 3,602,076

INVENTOR
SIEGFRIED PUCK
BY ARTHUR SCHWARTZ
ATTORNEY

TURNING TOOL ARRANGEMENTS FOR ROTATING CUTTER HEADS IN AUTOMATIC LATHES

Automatic lathes having a rotating cutter head which is provided with two tool holders in the form of rocking levers in an arrangement opposite to each other, are already known. The cutter head permits the use of radial tools and tangential tools of known tool types. It is easier to grind radial tools than to grind tangential tools. With rocking levers space requirements of the radial tools are comparatively high and permit arrangement of two tool holders only. On the other hand, space requirements of the tangential tools are comparatively small and permit arrangement of three tool holders in the form of rocking levers. However, tangential tools continue to be not favorable in that grinding is difficult and tool wear comparatively great.

It is an object of the present invention to make use of the advantages of radial tools (easy to grind, negligible wear) as well as of the advantages of tangential tools (permitting arrangement of three tool holders in a single plane), while at the same time eliminating the disadvantages of prior arrangements (with radial tools two tool holders only in a single plane; with tangential tools despite of three tool holders in a single plane comparatively great wear and difficult grinding).

According to the present invention this problem has been solved in that, in an arrangement of three tool holders in a single plane, the axis of each turning tool secured in a tool holder lies approximately in the bisecting line of the angle between the axial direction of a radial tool and the axial direction of a tangential tool, the roof-type cutter point of each turning tool having a cutting angle and a clearance angle like the radial and tangential tools.

According to this arrangement it is achieved that with the provision of tool holders in the form of rocking levers even three tool holders may be provided, as it is possible for tangential tools, and that the tools are easy to grind like radial tools.

The accompanying drawing shows an example of an embodiment according to the present invention.

Figure 1:
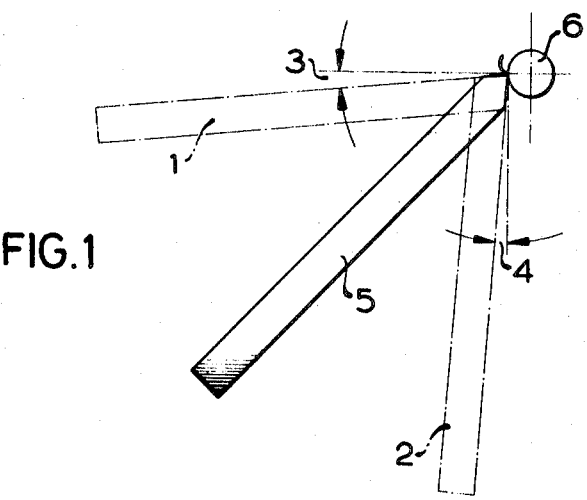
FIG. 1 shows the principle of tool arrangement.

In FIG. 1 a radial tool 1 and a tangential tool 2 are identified by a line of dots and dashes. The cutting angle has been identified by 3 and the clearance angle by 4.

Approximately midway between the otherwise usual arrangement of the radial tool 1 and the otherwise usual arrangement of the tangential tool 2 a turning tool 5 has been arranged according to the present invention. The roof-type cutter point of the turning tool 5 has a cutting angle 5 and a clearance angle 4 like the radial tool 1 and the tangential tool 2.

The work has been indicated by 6.

Figure 2:
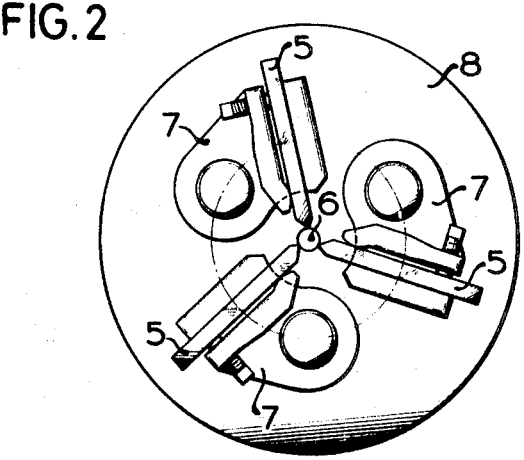
FIG. 2 is a diagrammatic front and elevational view of a cutter head incorporating a tool arrangement according to the present invention.

FIG. 2 shows in which way the turning tools 5 are secured in the turning tool holders 7, the latter having the form of rocking levers attached to the cutter head 8. The tool holders are positioned in a single plane.

What I claim is:

1. A rotating cutter head for automatic lathes comprising:
   a. three cutter tools on said cutter head, each of said cutter tools having a cutting face and a clearance face thereon, said cutting face and said clearance face joining each other to form an angle therebetween;
   b. means associated with each of said cutter tools for moving each of said cutter tools in an approximately radial direction, each of said cutter tool moving means being pivotally secured to said cutter head, the pivotal movement of each of said cutter tool moving means effecting an approximately radial movement of each of said cutter tools, so that each of said cutter tools is brought into and out of engagement with a workpiece;
   c. said cutting face of each of said cutter tools generally facing the direction of advance of each of said cutter tools;
   d. said clearance face of each of said cutter tools generally facing in a direction away from the direction of advance of each of said cutter tools;
   e. said cutting face and said clearance face joining each other in the area of each of said cutter tools which contacts the workpiece; the longitudinal axis of each of said cutter tools approximately bisecting the angle between said cutting face and said clearance face.